United States Patent
John (10) Patent No.: US 8,943,052 B2
(45) Date of Patent: Jan. 27, 2015

(54) SYSTEM AND METHOD FOR DATA MODELING

(75) Inventor: Jerry John, Bangalore (IN)

(73) Assignee: SAP AG, Walldorf (DE)

( * ) Notice: Subject to any disclaimer, the term of this patent is extended or adjusted under 35 U.S.C. 154(b) by 313 days.

(21) Appl. No.: 13/571,655

(22) Filed: Aug. 10, 2012

(65) Prior Publication Data

US 2014/0046936 A1   Feb. 13, 2014

(51) Int. Cl.
*G06F 17/30*   (2006.01)

(52) U.S. Cl.
USPC ............... 707/730; 707/804; 707/E17.015

(58) Field of Classification Search
CPC .................. G06F 17/3043; G06F 17/30401
USPC .................... 707/730, 804, E17.015
See application file for complete search history.

(56) References Cited

U.S. PATENT DOCUMENTS

| | | | | |
|---|---|---|---|---|
| 5,590,360 A * | 12/1996 | Edwards | ............................ | 1/1 |
| 7,899,837 B2 * | 3/2011 | Polo-Malouvier et al. | ... | 707/759 |
| 8,538,946 B1 * | 9/2013 | Thakur et al. | ................. | 707/706 |
| 8,752,004 B2 * | 6/2014 | Lian et al. | ..................... | 717/104 |
| 2002/0107840 A1 * | 8/2002 | Rishe | ................................ | 707/3 |
| 2008/0154975 A1 * | 6/2008 | Dettinger et al. | ............. | 707/200 |

OTHER PUBLICATIONS

Vey, SAP In-Memory Computing on IBM eX5 Systems, Jan. 2012, pp. 1-66.*
Lucredio, MOOGLE: A Model Search Engine, MoDELS 2008, LNCS 5301, 2008, pp. 296-310.*

* cited by examiner

*Primary Examiner* — Albert Phillips, III
(74) *Attorney, Agent, or Firm* — Fountainhead Law Group PC (57) ABSTRACT

A data modeling platform allows a user to enter a search request using natural language (e.g., typed or spoken). The search request may be semantically parsed to provide mapping to various database search elements. Pre-existing data models may be identified from the database search elements. One or more new data models may be created from the database search elements. The results represent candidate data models in response to the user's search request.

20 Claims, 12 Drawing Sheets

SYSTEM AND METHOD FOR DATA MODELING

BACKGROUND

Unless otherwise indicated herein, the approaches described in this section are not prior art to the claims in this application and are not admitted to be prior art by inclusion in this section.

Data modeling in a business enterprise requires different levels of expertise and may incur long turn around times. A typical workflow begins with the user (e.g., a sales manager, a manufacturing manager, and so on) specifying their data modeling needs or requirements to a developer; e.g., the information technologies (IT) group, third party provider, etc. The user making the request may be viewed as an expert who has specific knowledge about their particular practice (sales, production, etc.). The developer may be another expert who may have specific knowledge about the data systems (e.g., databases) of the business enterprise and how the data is represented (e.g., data models, data views, data tables, and so on) in the data systems.

Typically the user must convey their knowledge and particular data modeling needs to the developer who must then internalize and translate those requirements into understandable tasks on the data systems. This process can be time consuming and tedious, especially when the developer or group of developers may have to support requests from the many groups and departments within the business enterprise. Once translated, the developer may use a modeling tool or a scripting language to accomplish this task. This requires the developer to be highly skilled and have a solid understanding of both business requirements and technical knowledge.

Another aspect of the process is the potential for duplication of effort which may result in the proliferation of multiple similar data models. A large repository of data models may accumulate over time in a mature data system. Often times, the developer may not be aware that a previously defined data model exists that can satisfy the requirements of a particular user. As a result, the developer may create the same or similar data model, thus duplicating previous efforts. The proliferation of similar data models can create inconsistencies in the understanding of the business enterprise's data among different groups, increase the cost of managing unnecessarily large numbers of data models, and is generally not an optimal way to run and maintain the data systems.

DETAILED DESCRIPTION

In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Data modeling in accordance with principles of the present disclosure includes a user specifying their requirements for a data model as a "search request." A response to the search request may be a data model that can be "consumed" by the user. For example, the data model may be used by the user to perform analytics, create projections (e.g., sales projections, manufacturing targets, etc.), generate reports, and so on. The search request may be analyzed to identify one or more previously created data models ("pre-existing data models) from the database as candidate data models. The search request may also be used to create a new data model as a candidate, if pre-existing data models are deemed to be not adequate. A data model may be selected from among these candidate data models as a response to the search request and presented for consumption by the user.

Figure 1:
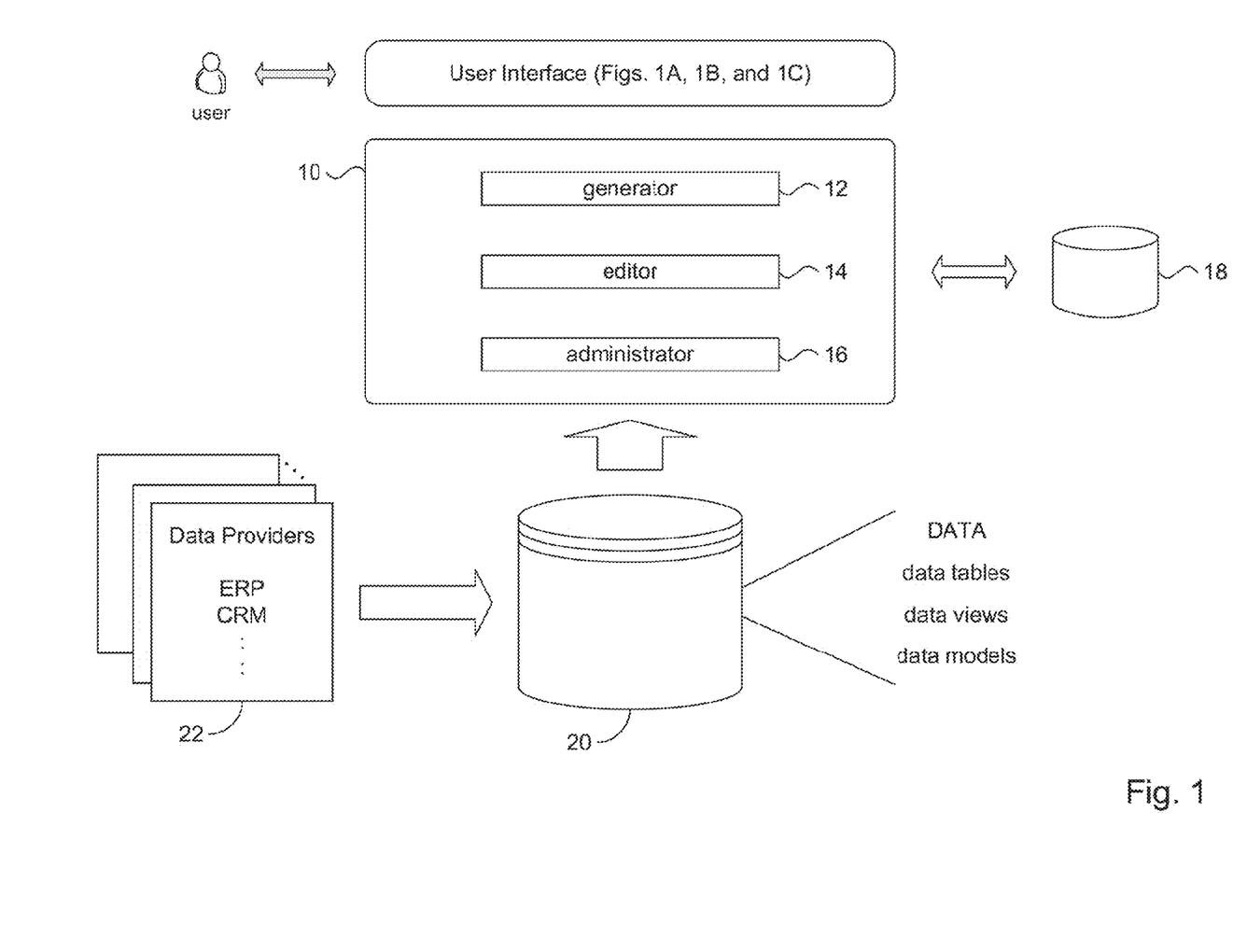
FIG. 1 is a high level representation of a data modeling platform in accordance with the present embodiment.

Referring to FIG. 1, embodiments in accordance with the present disclosure may be incorporated into a data modeling platform 10 (e.g., the SAP® HANA® Studio data modeling platform) to model data collected in a database 20. The database 20 may collect data from various operations of a business enterprise (data providers 22) such as an enterprise resource planning (ERP) system, customer relationship management (CRM), and so on.

The data modeling platform 10 may provide tools for accessing the database 20 to create and manage data models for performing analytics on the data models, generating reports, and so on. In accordance with the present disclosure, the data modeling platform 10 may comprise a generator 12 to generate data models, an editor 14 to edit and otherwise manage data models, and an administrator 16 to administer the data modeling platform (e.g., manage users, perform backups, conduct maintenance, and so on). The data modeling platform 10 may store its data in a data store 18. In some embodiments the data modeling platform 10 may use the database 20 to store its data.

Figure 1A:
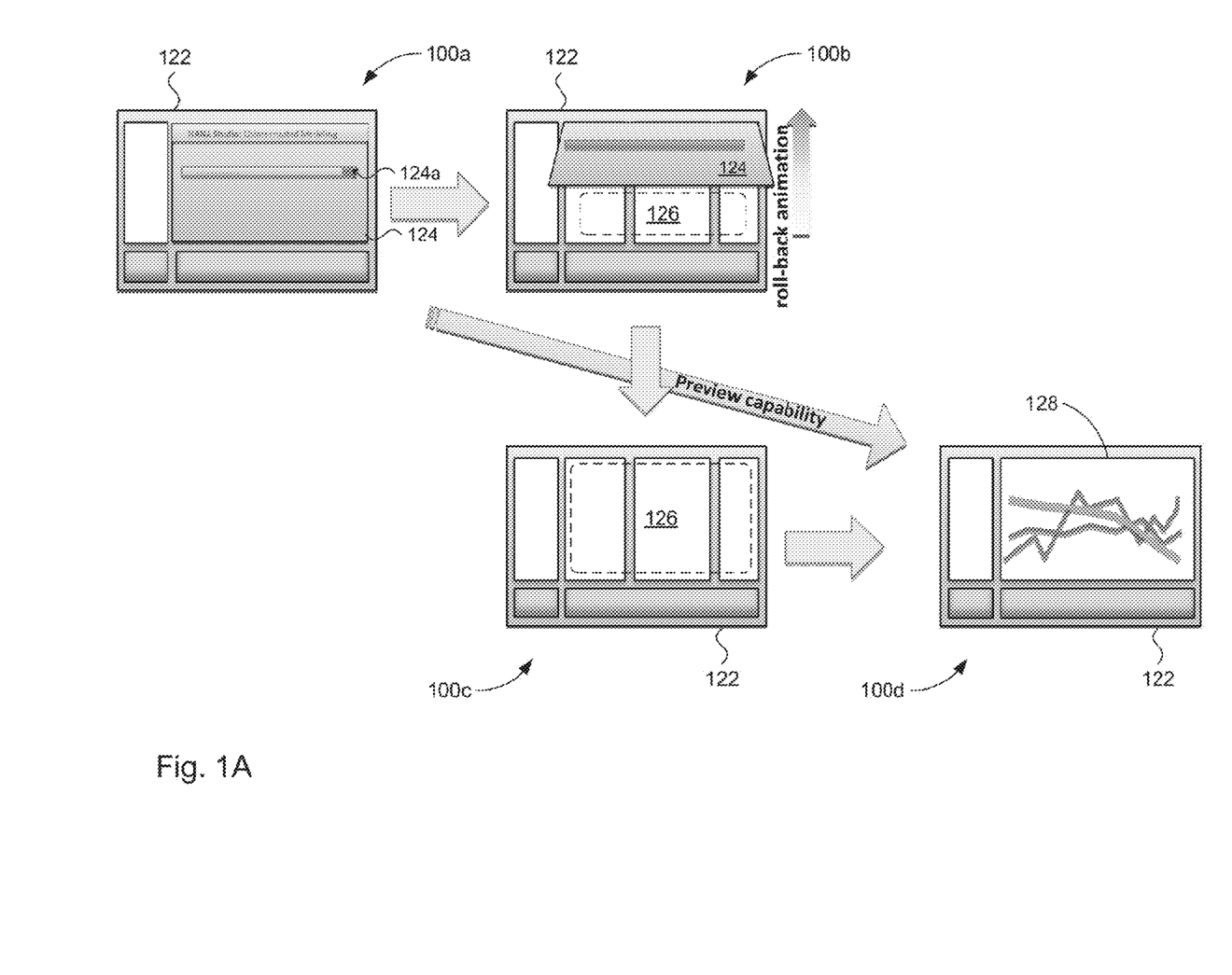
FIGS. 1A, 1B, and 1C are illustrative user interfaces for different configurations of a data modeling platform.

FIG. 1A illustrates several screenshot mockups 100a-100d of a user interface 122 of the data modeling platform 10 according to some embodiments of the present disclosure. In one screenshot 100a, the user interface 122 presents a search screen 124 for conducting searches. A search bar 124a allows a user to input a search request. Processing of the search request by the generator 12 to obtain a data model in response to the received search request will be discussed in more detail below.

The obtained data model may be proposed as a search result to the user. The user may want to inspect the details of the obtained data model. Accordingly, in some embodiments, such as shown in screenshot 100b, the search screen 124 may be "rolled back" (e.g., in a computer animation) to reveal a data modeling screen 126. Screenshot 100c shows that details of the obtained data model resulting from the user's search request may be presented in the data modeling screen 126. The user may utilize the editor 14 to review, optimize, or otherwise refine the obtained data model. Screenshot 100d illustrates a preview screen 128 that the user may call up in the user interface 122 to view, for example, a graphical representation of the obtained data model. The preview screen 128 can allow the user to graphically review the effects of any changes that the user makes to the obtained data model in the data modeling screen 126.

Figure 1B:
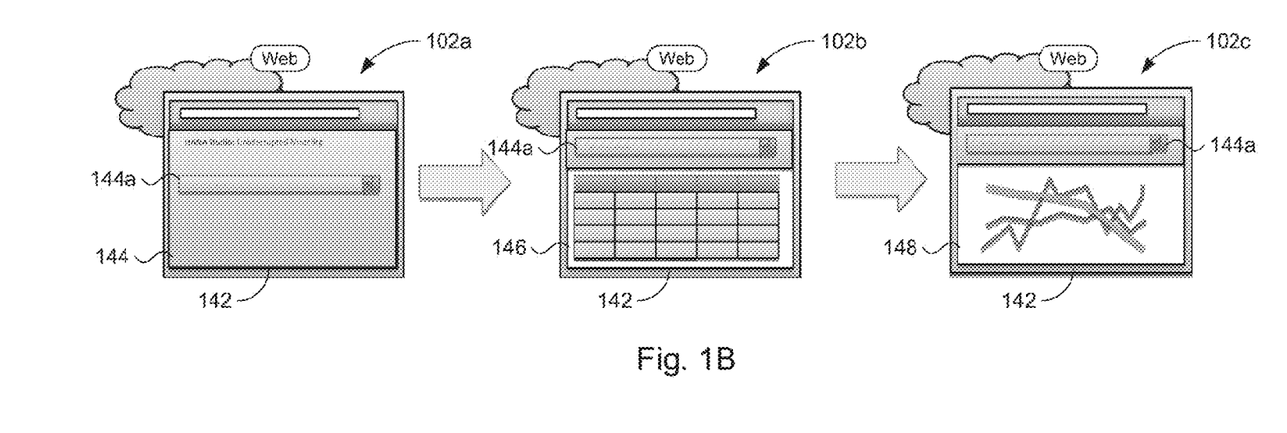

In some embodiments, the data modeling platform 10 may be accessed over the internet with Web interface (e.g., a browser) using Web services protocols such as simple object access protocol (SOAP), web services description language (WSDL), and the like. FIG. 1B shows an interface 142 for accessing the data modeling platform 10 over the Web. Interface 142 may be provided via a Web application (Web app) to access a Web server that runs the data modeling platform 10 and has access to the database 20. For example, the Web app may be invoked in a Web browser executing on the user's computer; e.g., a desktop computer, laptop computer, and so on. Screenshot 102a shows an initial interface 142 having search screen 144. A search bar 144a within the search screen 144 may be provided to receive the user's search request. Screenshot 102b shows the interface 142 displaying the search bar 144a along with a data preview screen 146. The data preview screen 146 displays an obtained data model generated from the user's search request in accordance with the present disclosure. The Web app may allow the user to review the obtained data model and to make revisions via the data preview screen 146. The user may call up an alternate preview screen 148, as illustrated in interface 102c, to graphically view the obtained data model.

Figure 1C:
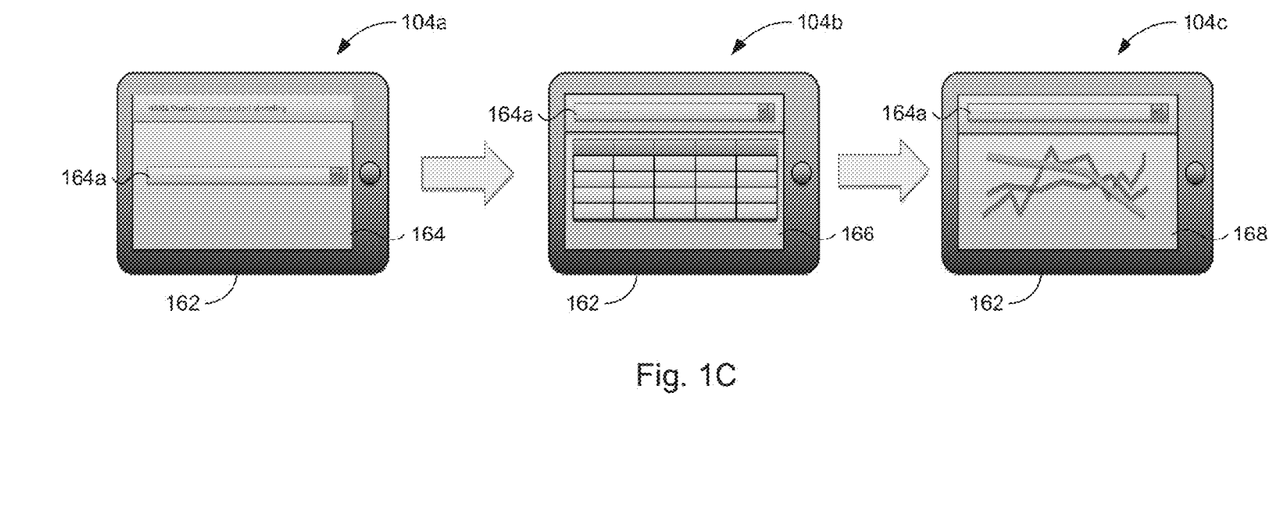

FIG. 1C shows, in some embodiments, an interface 162 for accessing the data modeling platform 10 via a mobile computing device such as a Google® Android® mobile computing device, an Apple® iPad® mobile computing device, and the like. The interface 162 may be provided by a mobile application (mobile app) that executes on the mobile computing device. The mobile app may communicate with a back end server over a suitable communication network to access data modeling services provided by the back end server. For example, the backend server may comprise the data modeling platform 10 and database 20. Screenshot 104a shows an initial interface 162 having a search screen 164 which includes a search bar 164a for receiving a search request from the user. A data preview screen 166 may be displayed in an area of the mobile computing device display screen along with the search bar 164a. The details of the obtained data model from the user's search request may be inspected and/or modified by the user in the data preview screen 166. A preview screen 168 allows the user to preview the obtained data model in the form of one or more graphs.

Figure 2A:
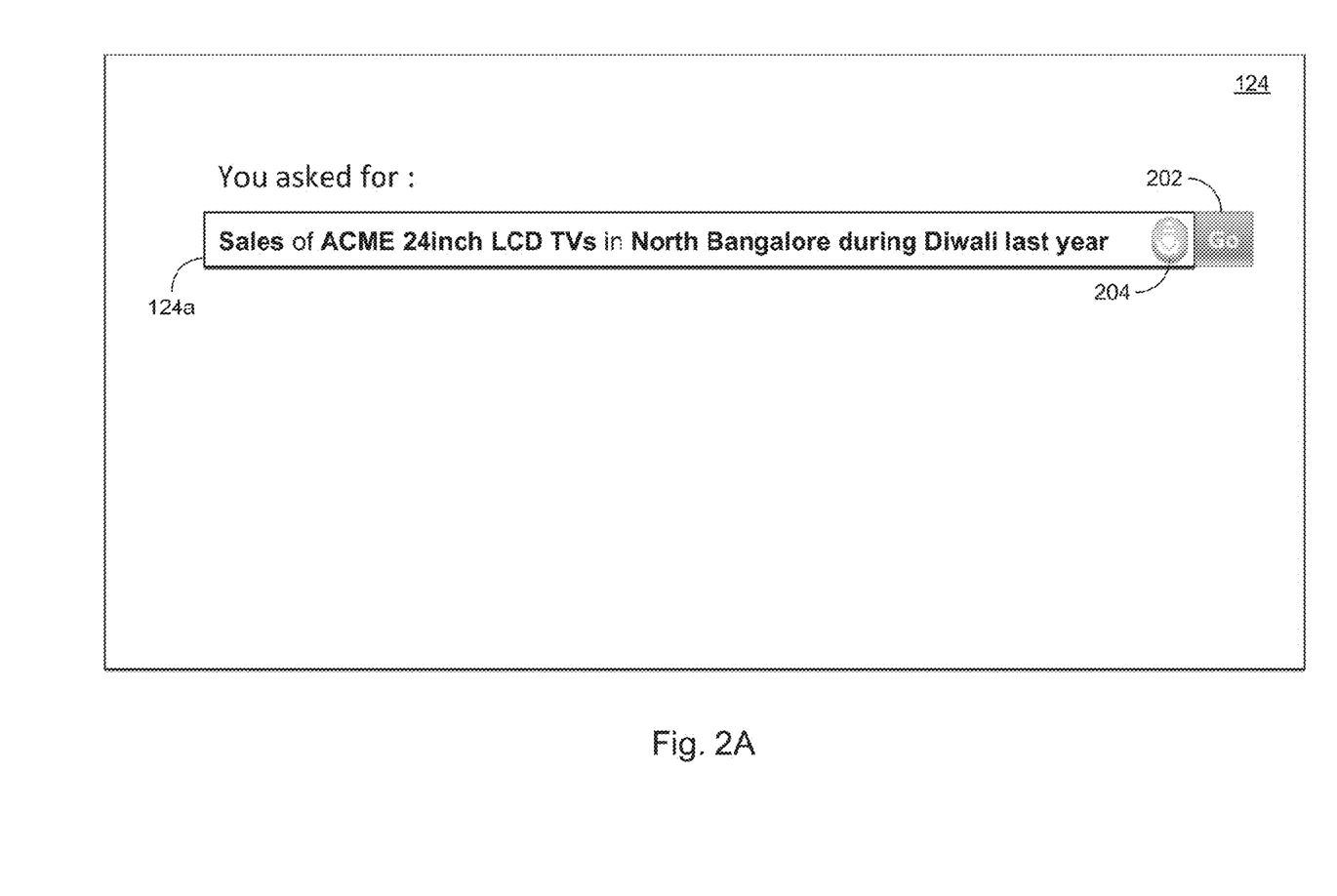
FIGS. 2A, 2B, 2C, and 2D are illustrative user interface mockups.

FIGS. 2A-2D illustrate additional details of search area 124 of the interface 122 shown in FIG. 1A. FIG. 2A shows the search bar 124a having a search request (e.g., "Sales of . . . last year") received from a user. In some embodiments, the search request may be typed in by the user. In other embodiments, the user may speak their search request. For example, in a mobile computing device configuration such as a computer tablet, the search bar 124a may include a voice input button 204. The user may tap on the voice input button 204 and speak their search request. Voice recognition functionality in the mobile computing device can convert the spoken input to produce text, which may be displayed in the search bar 124a. The user may then revise the generated text to correct or refine the search request. When the user is ready to submit their search request, they may use the "Go" button 202 to invoke the generator 12 to initiate data modeling in accordance with the present disclosure.

Figure 2B:
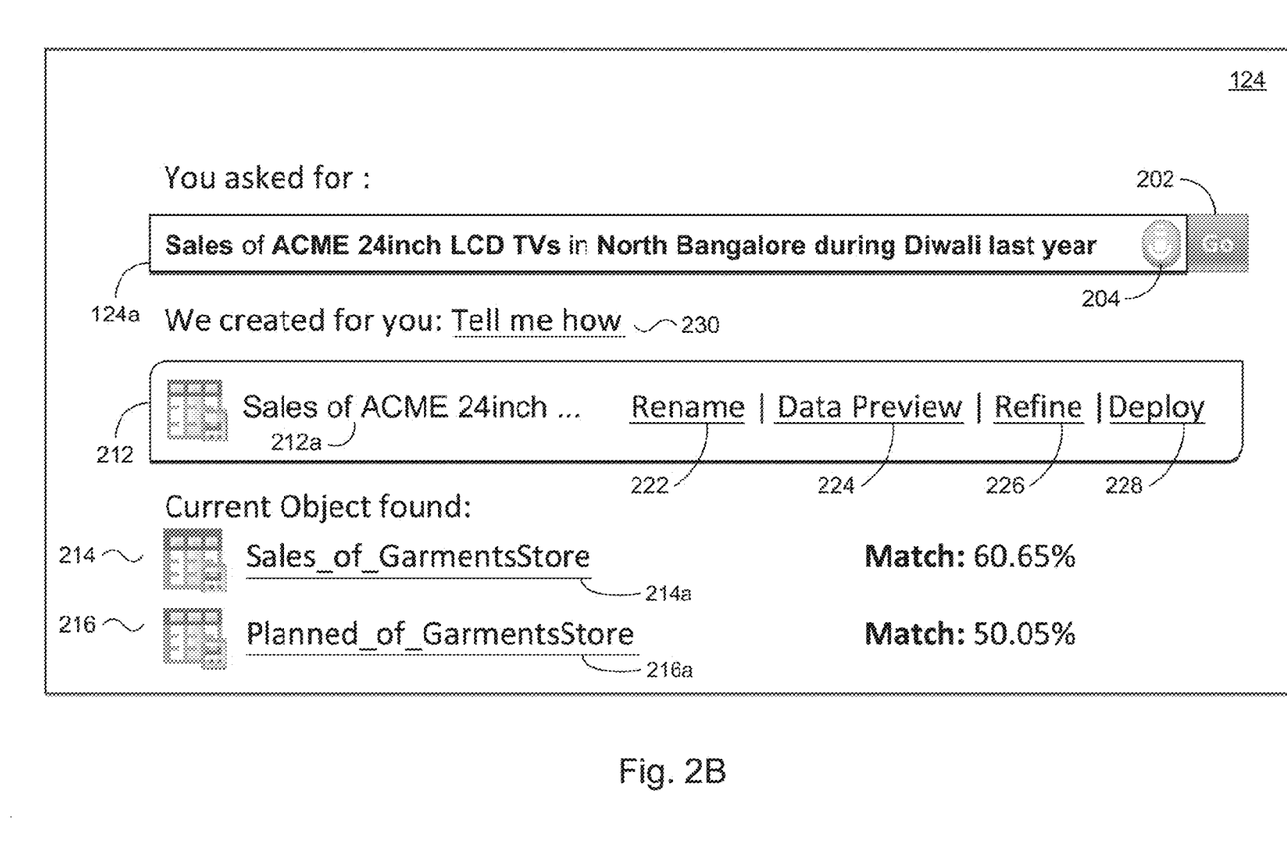

FIG. 2B shows an example of search screen 124 displaying results of the data modeling process. As will be explained below, the received search request may be processed by the generator 12 to produce a data model, which may then be presented to the user in a presentation area 212 as a proposed data model. The presentation area 212 may include a title of the proposed data model, and several links such as: Rename 222, Data Preview 224, Refine 226, Deploy 228.

A title 212a for the proposed data model may be generated in any suitable manner. For example, if the proposed data model is a pre-existing data model, then the title 212a can be the title of the pre-existing data model. If the proposed data model is a newly created data model, the title 212a may be any randomly generated text. However, a more meaningful title for the newly created data model may employ words from the received search request, such as in the example shown in FIG. 2B. The presentation area 212 may include a graphic, or text may appear in the title 212a, to inform the user whether the proposed data model is from a pre-existing data model or is a newly created data model.

The Rename link 222 may be used to launch a pop-up window allowing the user to rename the proposed data model. This may be useful if the proposed data model is newly created, or if the proposed data model is a pre-existing data model and the user wishes to modify it and save it as a new data model.

The Data Preview link 224 may be used to launch a window for displaying the proposed data model. For example, the proposed data model may be represented in a tabularized format, as a report, a graph, and so on. In some embodiments, as shown in FIG. 1, activating the Data Preview link 224 (e.g., clicking on it with a mouse input device, tapping on it, etc.) may initiate an animated sequence in which the search screen 124 "rolls back" as if looking under the hood of an automobile to reveal details of the proposed data model. The Data Preview link 224 allows the user to assess the correctness and accuracy of the proposed data model.

The Refine link 226 may be used to invoke the editor 14 to allow the user to modify data views and data tables of the proposed data model. In some embodiments, activating the Refine link 226 may initiate a roll-back animation sequence similar to the Data Preview link 224.

The Deploy link 228 allows the user to save the proposed data model (perhaps after being modified by the user). If the proposed data model was a pre-existing data model that was modified by the user, the modified data model may be saved as a new model and the user may be asked to provide a name for the new data model. The Deploy link 228 allows the user to add a new data model to the repository of data models in the data modeling platform 10, making it available for consumption by other users in the business enterprise.

In accordance with principles of the present disclosure, the generator 12 may identify one or more pre-existing data models as candidate solutions for the search request. One or more of the identified pre-existing data models may be presented to the user. Accordingly, in some embodiments, the search screen 124 may include a list of alternative data models 214, 216. A relevance score (labeled "Match") may be displayed with each alternative data model 214, 216. As illustrated in FIG. 2B, links 214a, 216a to the alternative data models 214, 216 may be provided to allow the user to invoke the editor 14 to view the data models, for example by clicking on a link.

If the generator 12 created a new data model as a solution to the user's search request, an information link 230 may be presented in the search screen 124. The information link 230 may be used to display additional details about how the new data model was created. In some embodiments, when the user clicks on the information link 230, the search screen may be replaced, or overlain, by a creation details screen 126 such as shown in FIG. 2C.

Figure 2C:
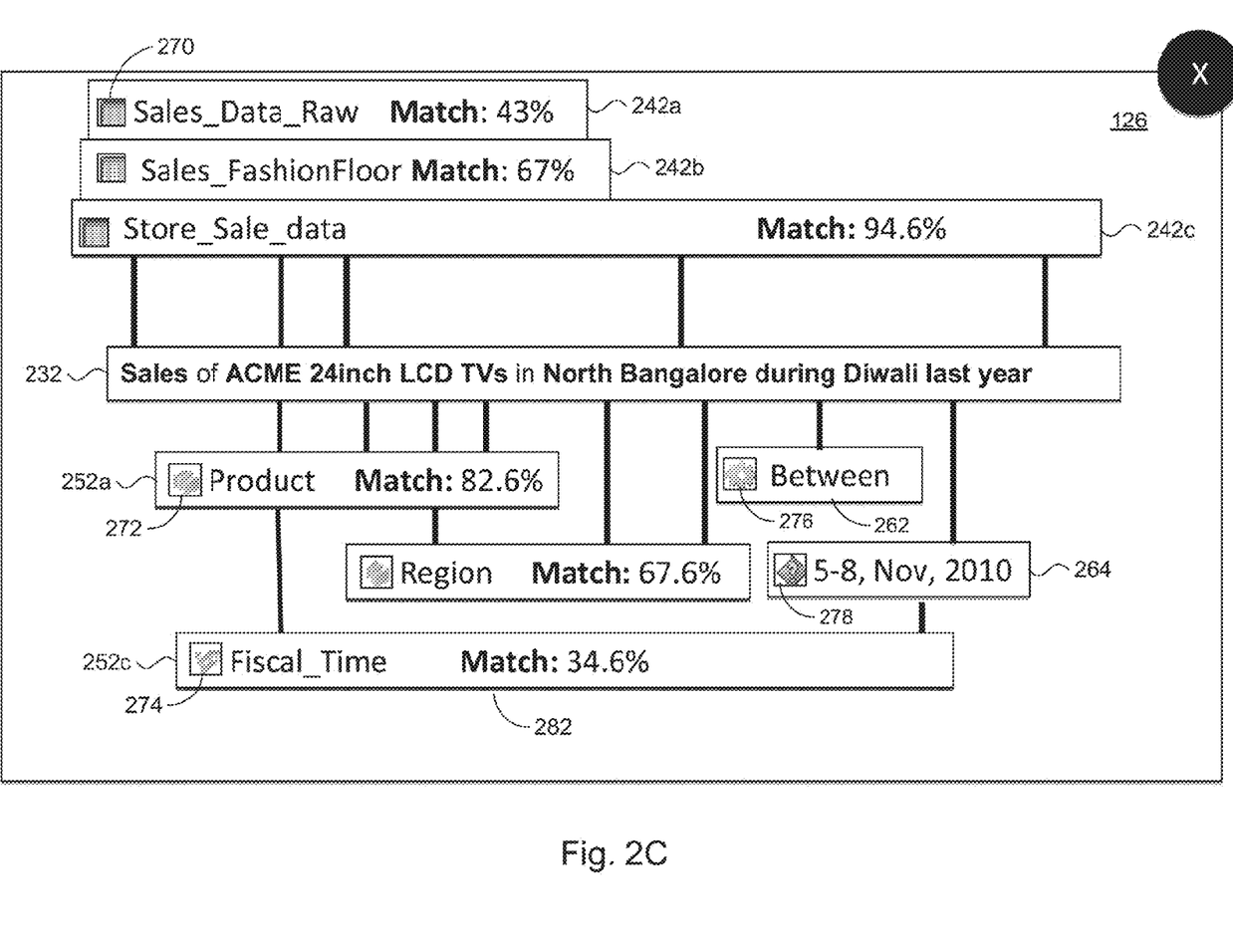

Referring to FIG. 2C, the creation details screen 126 may present various "modeling elements" that were identified during the data modeling process by the generator 12. The user-provided search request may be annotated with the modeling elements to give the user an understanding of the logic behind the proposed data model. Modeling elements may include fact tables and other data tables from the database 20, views produced from the database tables, database functions, Web application program interface (API) calls, and so on. Examples of typical modeling elements are shown in FIG. 2C including, for example, fact tables 242a, 242b, 242c, attribute views 252a, 252b, 252c, a database function 262, and a Web API function call 264. The different modeling elements may be displayed with corresponding icons 270, 272, 274, 276, and 278 to facilitate identifying each kind of modeling element. The examples are illustrative, of course, and do not represent an exhaustive list of modeling elements. FIG. 2C shows additional features of the creation details screen 126 which will be discussed below.

Figure 2D:
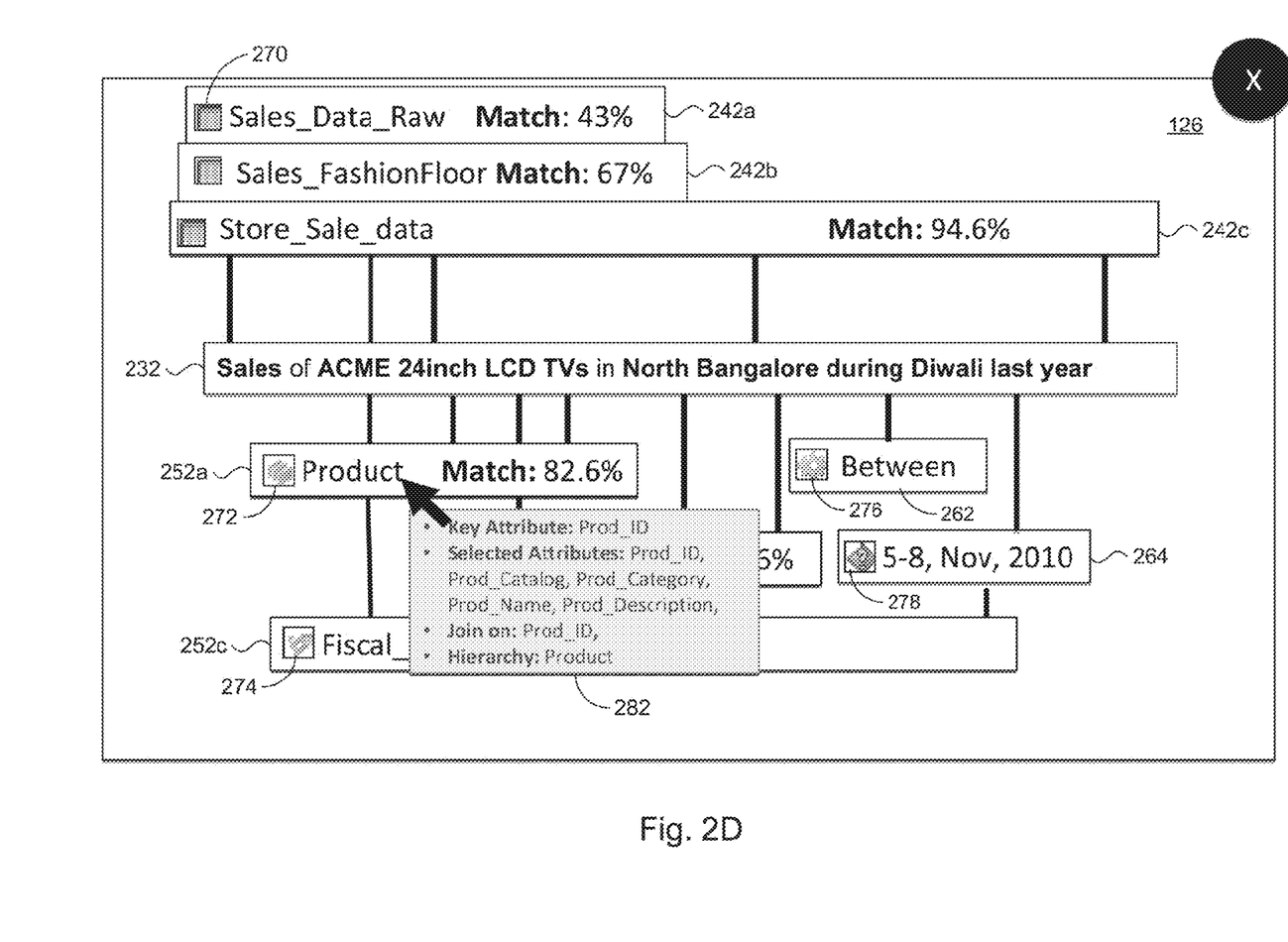

Additional information for each modeling element may be displayed. Referring to FIG. 2D, for example, if the user hovers their cursor over a modeling element (e.g., modeling element 252a), a pop-up window 282 may be displayed, providing additional information about that modeling element. In the specific example shown in FIG. 2D, the pop-up window 282 may be a tool tip that gives the user additional information about the JOIN operation being proposed. The tool tip shows the list of attributes selected, the key attribute, the join node and hierarchy if there is any. These represent elements required to qualify a JOIN between elements. Here, the mouse over is on the "Product" attribute view 252a.

Figure 3:
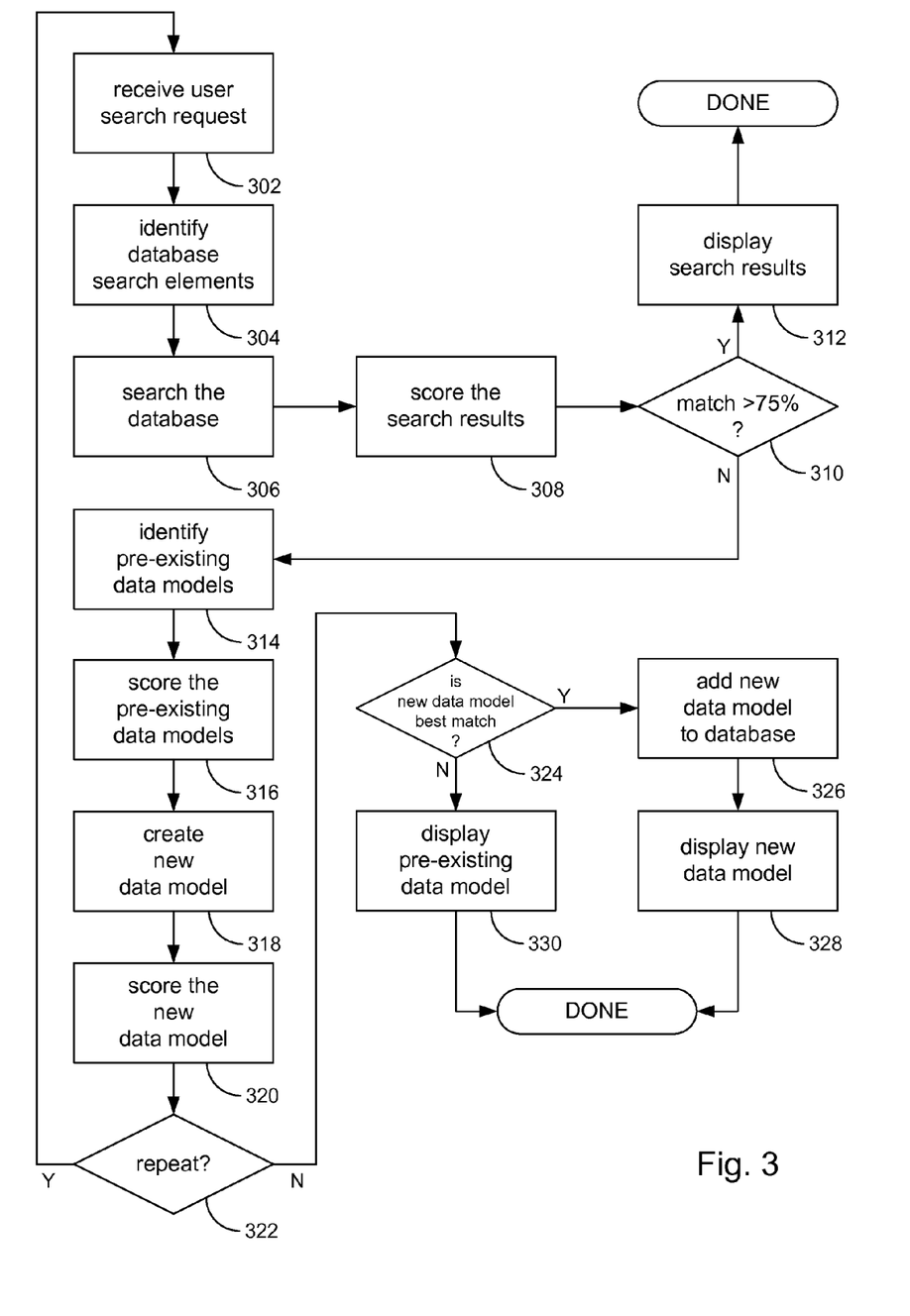
FIG. 3 shows a process flow in accordance with the present disclosure.

Referring now to FIG. 3, a process flow in accordance with some embodiments for data modeling is shown. Generally, a user who is interested in modeling data in the database 20 may submit a search request that sets forth the requirements of the desired data model. In response, a data model may be proposed to the user.

In a process block 302, the user may submit their search request (e.g., per FIG. 2A). The search request may be typed or spoken by the user. In accordance with the present disclosure, the search request is not restricted to a formal language specification such as SQL. The search request may be expressed as conversational language. If spoken, the search request may be converted to text using suitable voice recognition processing. The input may be optically scanned, in which case suitable optical character recognition software may be used to produce text that can then be processed.

In a process block 304, the received search request may be processed to identify database search elements using the words comprising the search request. As used herein, "database search elements" will refer to references that can be used to access data in the database 20 (FIG. 1). For example, database search elements may include references to data tables comprising the database 20, specific table fields, previously defined data models, views, key figures, SQL searches (e.g., SELECT customer_name FROM sales_table), SQL search terms (e.g., JOIN, BETWEEN, etc.), function references, and so on.

Figure 4A:
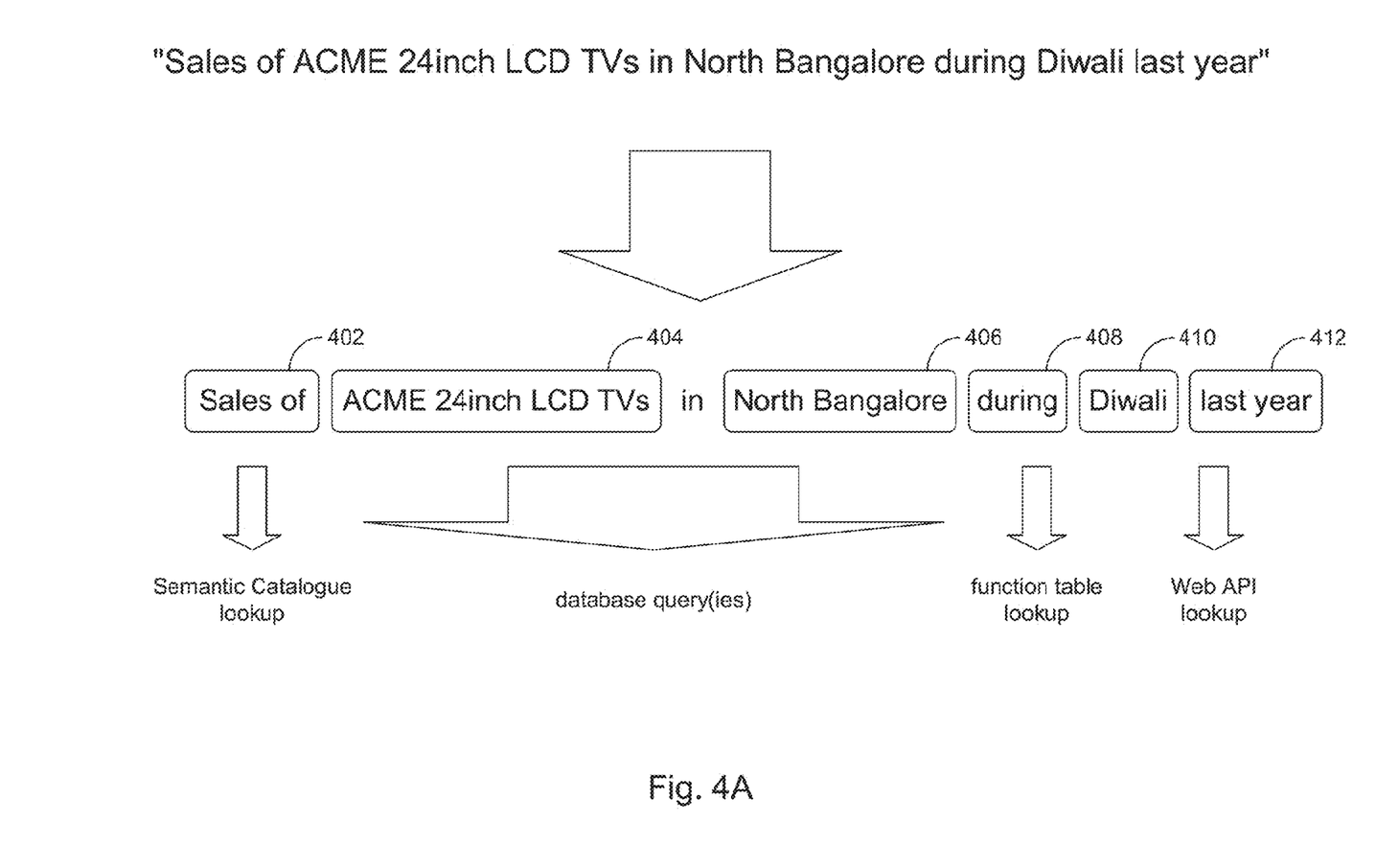
FIGS. 4A and 4B illustrate an example of the process flow of FIG. 3.
Figure 4B:
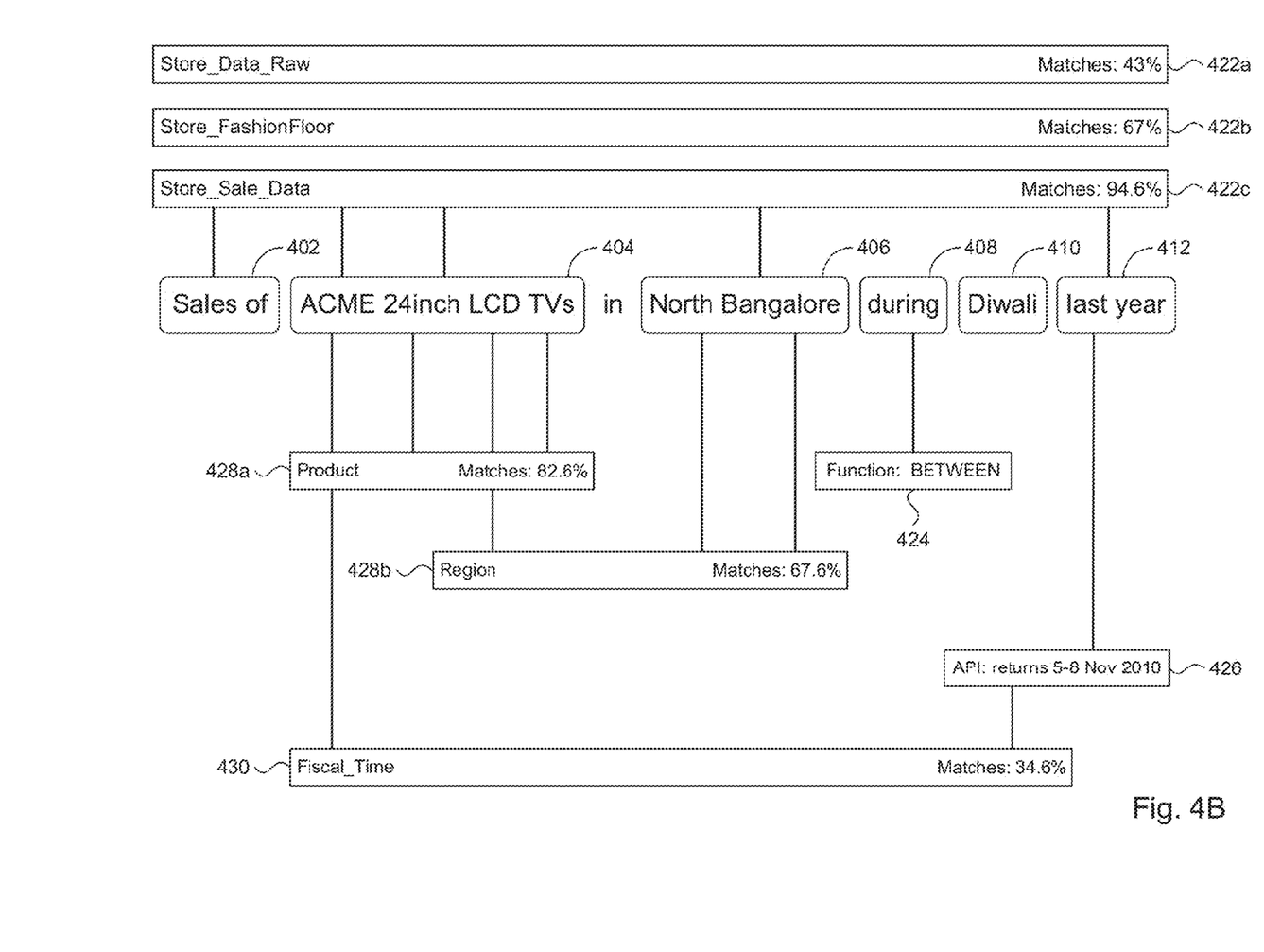

The process block 304 may include identifying words and phrases in the search request. FIGS. 4A and 4B show a running example to illustrate the process flow of FIG. 3. Referring to FIG. 4A, consider the search request "Sales of ACME 24 inch LCD TVs in North Bangalore during Diwali last year." The processing block 304 may identify fragments 402-410 from the search request. For example, the fragments 402-410 may be identified by parsing the search request with a suitable grammar. Semantic analysis and other natural language processing may also be employed.

The process block 304 may include a table lookup procedure to map some of the fragments 402-410 to one or more database search elements. The lookup process may attempt to match each fragment 402-410 against all the look up tables to find matches. Semantic mapping may be used to incorporate the meaning contained in the fragments 402-410, and to consider the context of the received search request. For example, the fragment 402 ("sales of") may map to various sales type data tables in database 20. The example in FIG. 4B shows that fragment 402 maps to three candidate data tables 422a-422c. Other fragments may be mapped against other lookup tables. For example, fragment 408 may be used do a table look up in a table comprising a list of database functions supported in the database 20; e.g., the figure shows that fragment 408 maps to a database function 424 called BETWEEN. Fragment 410 may be similarly mapped to a table of Web APIs, and so on; e.g., the figure shows that fragment 410 has been mapped to an API 426 that returns date and time information.

Returning to FIG. 3, in a process block 306, some of the fragments may be used to form a database query with which to search the database. For example, fragments 404 and 406 may be combined to form a query that is applied to the database 20. Queries can be made against existing data table definitions, formula function definitions, column views (in the case of a column-driven database, such as the SAP HANA® database product), and so on.

In a process block 308, search results from the search may be scored. For example, the search results may be scored based on how many keywords in the user's search request appear in the search results. In a decision block 310, if the score exceeds a certain threshold (e.g., 75% match or better), then the search results may be displayed in a process block 312.

If the score did not exceed the threshold in decision block 310, then the search request and any partial semantics obtained from the user's search request may be applied against a repository of previously defined data models. Accordingly, in a process block 314, results from processing in blocks 304 and 306 may be used to identify previously defined data models (pre-existing data models) stored in the database 20 as candidates that represent the user's search request. A data model may be defined by data tables from the database 20 and various views made on the referenced data tables. The query(ies) against that database 20 made in process block 306 may be made using fragments identified from the search request. Results from the queries may include references to data tables and views. In process block 314, those data tables and views may then be used to identify any pre-existing data models that reference those data tables and views. The identified pre-existing data models may serve as candidate data models for the search request. FIG. 4B, for example, shows views 428a and 428b obtained by searching the database 20 using fragments 404 and 406. View 430 represents a data object that propagates the time data (something on the repository side to validate what the meaning of "Time" is). This view 430 may be an auto-generated Attribute View in the repository and may be made available during modeling. Another type of time definition is Gregorian Time, for example.

In process block 316, the database search elements identified in process blocks 304, 306, and 308 may be assigned scores. In some embodiments, the scores may represent a degree of matching between the fields in the data tables or views and terms in the user's search request. The scores may be determined using the fragments 402-410 identified from the search request. The scores may be based on a combination of words and phrases in the search request other than fragments 402-410. Referring to our running example in FIG. 4B, the data tables 422a-422c have been assigned respective scores of 43%, 67%, and 94.6%. The views 428*a*, 428*b*, and 430 have been assigned respective scores of 82.6%, 67.6%, and 34.6%. For some database search elements, such as function 424 and API return value 426, assigning a score may not be meaningful.

In a process block 318, a new data model may be created as a candidate for the search request in addition to pre-existing data models identified in process block 314. In some embodiments, the new data model may be created from the database search elements identified in process blocks 304 and 306, and from data models identified in process block 314. The user's search request may be used to inform the creation process. In a process block 320, the new data model may be given a score; e.g., in the same manner as described for process block 316.

The process may be iterated. In some embodiments, a decision block 322 may determine whether to repeat the foregoing process blocks. For example, if all of the data model scores fall below a threshold score then there would be no candidate data models for representing the user's search request. Accordingly, the process may be repeated in an attempt to identify additional data models that may be more relevant (and hence score higher) to the user's search request.

At this point, the candidate data models include pre-existing data models and a newly created data model. In a process block 324, if the new data model has or shares the highest score, then in process block 326 the new data model may be added to the repository of pre-existing data models in the database 20, and in process block 328 the new data model is displayed as a result to the user's search request. Otherwise, in step 330, the pre-existing data model having the highest score may be displayed as a result to the user's search request.

Figure 5:
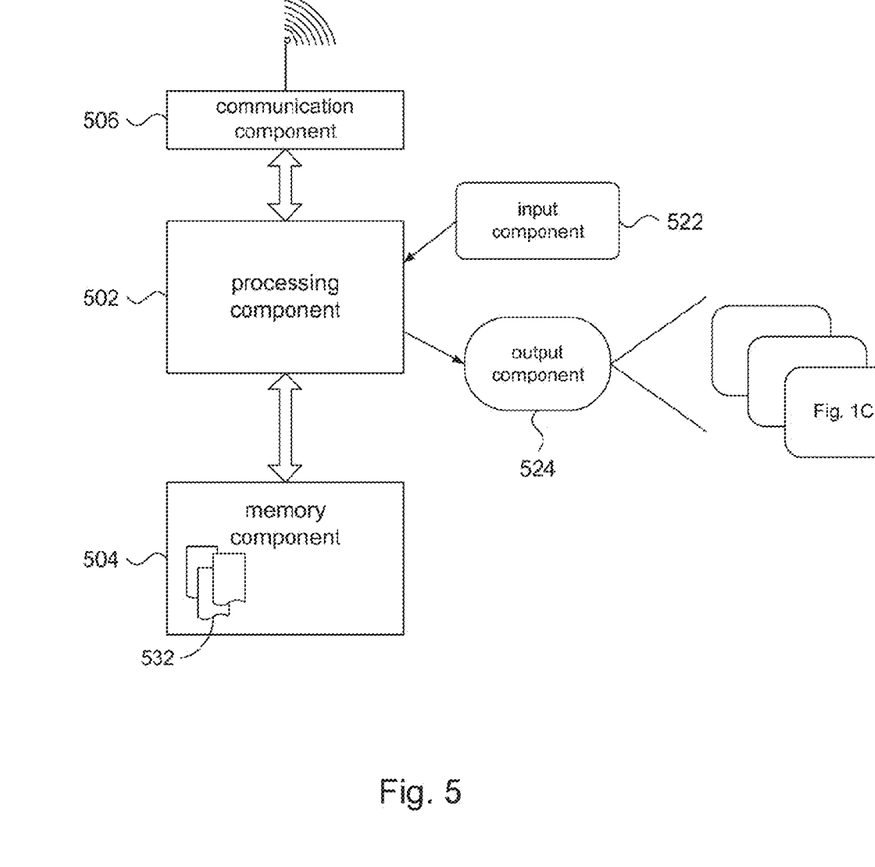
FIG. 5 shows a configuration for a mobile computing device in accordance with an embodiment of the present disclosure.

A particular embodiment of a mobile computing device in accordance with the present disclosure is illustrated by the block diagram in FIG. 5. The mobile computing device may comprise a processing component 502 such as a microcontroller. A memory component 504 may comprise static memory (e.g., flash random access memory, RAM), dynamic memory (dynamic random access memory, DRAM), or other non-transitory computer storage medium. The memory component 504 may store data and apps that can be executed by the mobile computing device. For example, the memory component 504 may store app 532 comprising computer executable program code that can perform process blocks shown in FIG. 3. A communication component 506 may provide a suitable wireless communication channel to the business enterprise's backend servers; e.g., to access database 20. The communication component 506 may support several wireless communication formats, including for example, Bluetooth, 3G, and so on.

The mobile computing device may include an input component 522 and an output component 524. In some embodiments, the input component 522 and the output component 524 may be integrated in one component such as a touch-sensitive display. In other embodiments, they may be separate. In accordance with the present disclosure, the processing component 502 may present certain displays on the output component 524. For example, the output component 524 may support the interface 162 illustrated in FIG. 1C.

Figure 6:
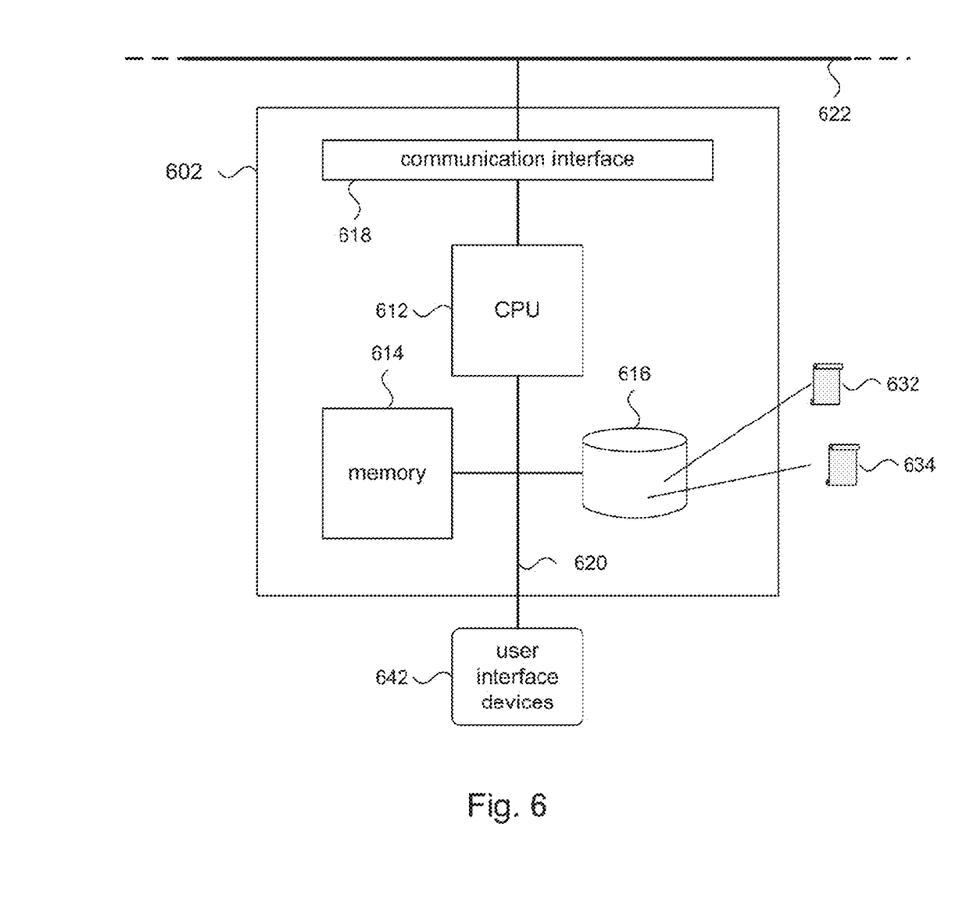
FIG. 6 shows a configuration for a computer system in accordance with an embodiment of the present disclosure.

A particular embodiment of the data modeling platform 10 in accordance with the present disclosure is illustrated in FIG. 6, showing a high level block diagram of a computer system 602 configured to operate in accordance with the present disclosure. The computer system 602 may be configured as a web server that supports the data modeling platform 10. The web server may include the database 20, or otherwise have access to the database. The computer system may be configured as a backend server for mobile computing devices, providing the services of the data modeling platform 10 and the database 20.

The computer system 602 may include a central processing unit (CPU) or other similar data processing component. The computer system 602 may include various memory components. For example, the memory components may include a volatile memory 614 (e.g., random access memory, RAM) and a data storage device 616. A communication interface 618 may be provided to allow the computer system 602 to communicate over a communication network 622, such as a local area network (LAN), the Internet, and so on. An internal bus 620 may interconnect the components comprising the computer system 602.

The data storage device 616 may comprise a non-transitory computer readable medium having stored thereon computer executable program code 632. The computer executable program code 632 may be executed by the CPU 612 to cause the CPU to perform steps of the present disclosure, for example the process flow set forth in FIG. 3. The data storage device 616 may store data structures 634 such as pre-existing data models, views, and so on. A user may interact with the computer system 602 using suitable user interface devices 642. They may include, for example, input devices such as a keyboard, a keypad, a mouse or other pointing device, and output devices such as a display. The user interface devices 642 may support the user interface 122 shown in FIG. 1A.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Advantages and Technical Effect

Data modeling in accordance with the present disclosure uses information (user search request) with semantics, such as used in human communication for example. The information is then translated into a sequence for searching pre-existing data models which might satisfy the modeling requirements specified in the user's search request. This allows for potential re-use of existing data modeling objects, thus avoiding the problem of duplication. Data modeling is simplified since the user does not need to be highly skilled in model building or require in-depth knowledge of the database. The above description illustrates various embodiments of the present disclosure along with examples of how aspects of the present disclosure may be implemented.

The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A computer implemented method for modeling data in database comprising operating a computer system to perform steps of:
receiving a search request;
identifying database search elements from words comprising the search request;
searching the database using the database search elements to produce a plurality of database search results;
identifying a plurality of pre-existing data models from the database search results;
assigning a score to each of the pre-existing data models;
creating a new data model using at least some of the database search elements;
assigning a score to the new data model; and
outputting a data model from among the pre-existing data models and the new data model which is assigned a highest score.

2. The method of claim 1 wherein the database search elements comprise identifications of data tables in the database.

3. The method of claim 1 wherein the database search elements comprise one or more sequential query language (SQL) queries.

4. The method of claim 1 wherein the database search elements comprise one or more views of data tables.

5. The method of claim 1 wherein searching the database using the database search elements includes generating one or more database queries from the database search elements.

6. The method of claim 1 wherein if the new data model is assigned the highest score, then adding the new data model to the database.

7. The method of claim 1 wherein identifying database search elements includes mapping words or phrases in the search request to identifications of data tables in the database, table fields of the data tables, views, and functions.

8. A data modeling platform comprising:
a computer processor;
a memory having stored thereon computer executable program instructions which, when executed by the computer processor, causes the computer processor to:
receive a search request;
identify database search elements from words comprising the search request;
search the database using the database search elements to produce a plurality of database search results;
identify a plurality of pre-existing data models from the database search results;
assign a score to each of the pre-existing data models;
create a new data model using at least some of the database search elements;
assign a score to the new data model; and
output a data model from among the pre-existing data models and the new data model which is assigned a highest score.

9. The data modeling platform of claim 8 wherein the database search elements comprise identifications of data tables in the database.

10. The data modeling platform of claim 8 wherein the database search elements comprise one or more sequential query language (SQL) queries.

11. The data modeling platform of claim 8 wherein the database search elements comprise one or more views of data tables.

12. The data modeling platform of claim 8 wherein searching the database using the database search elements includes generating one or more database queries from the database search elements.

13. The data modeling platform of claim 8 wherein if the new data model is assigned the highest score, then adding the new data model to the database.

14. The data modeling platform of claim 8 wherein identifying database search elements includes mapping words or phrases in the search request to identifications of data tables in the database, table fields of the data tables, views, and functions.

15. A non-transitory computer-readable storage medium having stored thereon computer executable program code which, when executed by a computer processor, causes the computer processor to perform steps of:
receiving a search request;
identifying database search elements from words comprising the search request;
searching the database using the database search elements to produce a plurality of database search results;
identifying a plurality of pre-existing data models from the database search results;
assigning a score to each of the pre-existing data models;
creating a new data model using at least some of the database search elements;
assigning a score to the new data model; and
outputting a data model from among the pre-existing data models and the new data model which is assigned a highest score.

16. The non-transitory computer-readable storage medium of claim 15 wherein the database search elements comprise identifications of data tables in the database.

17. The non-transitory computer-readable storage medium of claim 15 wherein the database search elements comprise one or more sequential query language (SQL) queries.

18. The non-transitory computer-readable storage medium of claim 15 the database search elements comprise one or more views of data tables.

19. The non-transitory computer-readable storage medium of claim 15 wherein searching the database using the database search elements includes generating one or more database queries from the database search elements.

20. The non-transitory computer-readable storage medium of claim 15 wherein if the new data model is assigned the highest score, then adding the new data model to the database.

* * * * *